(12) United States Patent
Scott et al.

(10) Patent No.: US 9,067,304 B2
(45) Date of Patent: Jun. 30, 2015

(54) METHODS OF FORMING POLYCRYSTALLINE COMPACTS

(75) Inventors: Danny E. Scott, Montgomery, TX (US); Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 175 days.

(21) Appl. No.: 13/618,927

(22) Filed: Sep. 14, 2012

(65) Prior Publication Data

US 2013/0067825 A1 Mar. 21, 2013

Related U.S. Application Data

(60) Provisional application No. 61/535,605, filed on Sep. 16, 2011.

(51) Int. Cl.
| | |
|---|---|
| *B24D 3/00* | (2006.01) |
| *B24D 3/14* | (2006.01) |
| *B24D 18/00* | (2006.01) |
| *B24D 99/00* | (2010.01) |

(52) U.S. Cl.
CPC .............. *B24D 3/14* (2013.01); *B24D 18/0009* (2013.01); *B24D 99/005* (2013.01)

(58) Field of Classification Search
CPC ............ B24D 3/00; B24D 18/00; B32B 9/00; B32B 11/00
See application file for complete search history.

(56) References Cited

U.S. PATENT DOCUMENTS

| | | |
|---|---|---|
| 5,890,552 A | 4/1999 | Scott et al. |
| 6,220,375 B1 | 4/2001 | Butcher et al. |
| 6,342,301 B1 | 1/2002 | Yoshida et al. |

(Continued)

FOREIGN PATENT DOCUMENTS

| | | |
|---|---|---|
| GB | 2493451 A | 2/2013 |
| WO | 2007083248 A1 | 7/2007 |

(Continued)

OTHER PUBLICATIONS

Rice, Roy W., Ceramic Fabrication Technology, Marcel Dekker, Inc., New York, NY, (2003), pp. 206-207.

(Continued)

*Primary Examiner* — Pegah Parvini
(74) *Attorney, Agent, or Firm* — TraskBritt

(57) ABSTRACT

Methods for forming cutting elements, methods for forming polycrystalline compacts, and related polycrystalline compacts are disclosed. Grains of a hard material are subjected to a high-pressure, high-temperature process to form a polycrystalline compact. Inclusion of at least one relatively quick spike in system pressure or temperature during an otherwise plateaued temperature or pressure stage accommodates formation of inter-granular bonds between the grains. The brevity of the peak stage may avoid undesirable grain growth. Embodiments of the methods may also include at least one of oscillating at least one system condition (e.g., pressure, temperature) and subjecting the grains to ultrasonic or mechanical vibrations. A resulting polycrystalline compact may include a high density of inter-granularly bonded hard material with a minimized amount of catalyst material, and may provide improved thermal stability, wear resistance, toughness, and behavior during use of a cutting element incorporating the polycrystalline compact.

18 Claims, 8 Drawing Sheets

(56) References Cited

U.S. PATENT DOCUMENTS

| | | |
|---|---|---|
| 6,521,174 B1 | 2/2003 | Butcher et al. |
| 6,872,356 B2 | 3/2005 | Butcher et al. |
| 7,575,805 B2 | 8/2009 | Achilles et al. |
| 7,754,333 B2 | 7/2010 | Eyre et al. |
| 2008/0185189 A1 | 8/2008 | Griffo et al. |
| 2010/0243337 A1 | 9/2010 | Scott |
| 2010/0294571 A1 | 11/2010 | Belnap et al. |
| 2011/0031034 A1 | 2/2011 | DiGiovanni et al. |
| 2011/0061942 A1 | 3/2011 | DiGiovanni |
| 2011/0088954 A1 | 4/2011 | DiGiovanni et al. |
| 2011/0189468 A1* | 8/2011 | Bertagnolli et al. ....... 428/312.8 |
| 2012/0261197 A1 | 10/2012 | Miess et al. |

FOREIGN PATENT DOCUMENTS

| | | |
|---|---|---|
| WO | 2011003051 A2 | 1/2011 |
| WO | 2013040292 A2 | 3/2013 |

OTHER PUBLICATIONS

Kriven, Waltraud M., Transformation Toughening of Composite Ceramics, Interim Report for the Period Mar. 1, 1989 to Sep. 30, 1990, prepared for Air Force Office of Scientific Research, Dept. of Materials Science and Engineering, Univ. of Illinois at Urbana-Champaign, Urbana, IL, (Oct. 30, 1990), 129 pages.

Richerson, David W., Modern Ceramic Engineering: Properties, Processing, and Use in Design, Marcel Dekker, Inc., New York, NY, (1992), pp. 613-614.

Anonymous, Hot Pressing, Wikipedia, (page last modified on Jan. 3, 2013 at 8:53 am), 5 pages.

International Search Report and Written Opinion for PCT/US2012/055293, dated Feb. 21, 2013.

International Preliminary Report on Patentability for PCT/US2012/055293, dated Mar. 18, 2014.

\* cited by examiner

METHODS OF FORMING POLYCRYSTALLINE COMPACTS

CROSS-REFERENCE TO RELATED APPLICATION

This application claims the benefit of U.S. Provisional Patent Application Ser. No. 61/535,605, filed Sep. 16, 2011, the disclosure of which is hereby incorporated herein in its entirety by this reference.

TECHNICAL FIELD

Embodiments of the present disclosure relate to polycrystalline compacts, to tools including such compacts, and to methods of forming such polycrystalline compacts and tools.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements fixedly attached to a bit body of the fixed-cutter drill bit. Similarly, roller cone earth-boring rotary drill bits include cones that are mounted on bearing pins extending from legs of a bit body such that each cone is capable of rotating about the bearing pin on which it is mounted. A plurality of cutting elements may be mounted to each cone of such roller cone drill bit.

The cutting elements used in fixed-cutter, roller cone, and other earth-boring tools often include polycrystalline compact cutting elements, e.g., polycrystalline diamond compact ("PDC") cutting elements. The polycrystalline compact cutting elements include cutting faces of a polycrystalline compact of diamond or another hard material (collectively referred to herein as "hard material"). Grains or crystals of the hard material are inter-bonded within the polycrystalline compact. (The terms "grain" and "crystal" are used synonymously and interchangeably herein.) Thus, the polycrystalline compacts include direct, inter-granular bonds between the grains or crystals of hard material.

Polycrystalline compact cutting elements may be formed by sintering and bonding together relatively small grains of the hard material in the presence of a metal solvent catalyst under high temperature and high pressure conditions (referred to herein as "high-pressure, high-temperature processes" ("HPHT processes") or "high-temperature, high-pressure processes" ("HTHP processes")). The HPHT process forms a layer or "table" of polycrystalline diamond material (or alternative hard material), which may be formed on or later joined with a cutting element substrate. The cutting element substrate may comprise a cermet material (i.e., a ceramic-metal composite material) such as, for example, cobalt-cemented tungsten carbide.

The metal solvent catalyst may include, for example, cobalt, iron, nickel, or alloys and mixtures thereof. The catalyst, which may initially be in a powdered form, may be mixed with the grains of hard material prior to sintering the grains together in the HPHT process. Alternatively or additionally, when a polycrystalline compact is formed on a cutting element substrate that includes a material such as cobalt, the cobalt, or other such material, from the substrate may be swept into the grains of hard material during the sintering process and may serve as the catalyst material for forming the inter-granular bonds between the grains of hard material. For example, cobalt from a substrate may be swept into overlying diamond grains of a diamond table to be formed and may catalyze the formation of diamond-to-diamond bonds.

Upon formation of a polycrystalline table using an HPHT process, catalyst material may remain in interstitial spaces between the grains of hard material in the resulting polycrystalline table. The presence of the catalyst material in the polycrystalline table may contribute to thermal damage in the polycrystalline table when the cutting element is heated, during use, due to friction at the contact point between the cutting element and the earth formation. To reduce the amount of catalyst material remaining in the polycrystalline table after formation, and, therefore, to reduce the likelihood of subsequent thermal damage during drilling, smaller grains of hard material may be included in the interstitial spaces between grains of hard material. Where the hard material is diamond, the smaller, fine grains may also be diamond. These interstitial fine grains of hard material increase the amount of hard material included in the polycrystalline table formed, lower the amount of catalyst needed to fill remaining interstitial space, and contribute to the hardness and strength of the cutting element while lessening the risk of thermal damage.

The HPHT process may be carried out by introducing the grains of hard material and, optionally, the catalyst material intermixed with the grains to a press (e.g., a diamond press, a cubic press, or other such press) either with or without a substrate. The press is configured to subject the materials therein to extreme pressures and temperatures. The pressure and power input can be adjusted, with adjustments to the power input yielding a change in the temperature within the press. Due to the extreme temperatures involved, the temperature within the HPHT system may not be directly monitored, but may be a factor of the power input.

A conventional HPHT process for forming a diamond table of a PDC may generally include a raise in pressure until the diamond material is near a sintering range. Power may then be steadily applied to provide essentially a steady temperature. The steady application of power at steady application of pressure provides for a relatively flat interval, or "plateau," which may be held for several minutes or longer at a relatively steady pressure and temperature. Thereafter, the temperature and pressure of the system are dropped to well below the diamond stable region before the formed parts are removed from the HPHT system. This HPHT process may be represented by temperature versus time and pressure versus time profiles such as those illustrated in FIGS. 6 and 7.

In a conventional HPHT process, during the plateaus, i.e., the steady applications of pressure and temperature, the hard material is sintered, and inter-granular bonds are formed between the grains of hard material. The conventional HPHT process is, however, subject to a trade-off between encouraging formation of desirable inter-granular bonds and discouraging undesirable grain growth, chemical breakdown of the hard material, and other impairments to the physical properties of the table to be formed. More particularly, high temperatures and pressures encourage formation of inter-granular bonds. However, at temperatures at or above about 750° C., some of the hard material crystals within the hard material table may react with catalyst material, causing the hard material to undergo a chemical breakdown or conversion. For example, diamond may breakdown or be converted to another allotrope of carbon, or diamond crystals may graphitize at the diamond crystal boundaries, which may substantially weaken the diamond table. Also, at extremely high temperatures, in addition to graphite, some of the diamond crystals may be converted to carbon monoxide and carbon dioxide. Also, at high temperatures and/or pressures, nanoparticles of the hard material included within the structure may dissolve into catalyst material and later redeposit on solids within the structure, thereby contributing to unwanted grain growth. In other words, the grains of hard material may dissolve at elevated temperatures and pressures and later redeposit on other grains, causing changes to the microstructure.

The physical properties of the body of the polycrystalline compact are dependent on the microstructure. Dissolving and redepositing hard material on other grains may result in formation of larger-grain microstructures, which presents the properties of such larger-grain microstructures. The properties of the larger-grain microstructures may not be desirable and may negatively impact the table's thermal stability, wear resistance, and toughness during subsequent use.

Nonetheless, when forming, by conventional HPHT processes, cutting elements including small, fine grains of hard material within interstitial spaces between larger, coarse grains of hard material, the maximized temperature and pressure conditions that accommodate formation of wanted intergranular bonds may conflict with efforts to avoid dissolution and redeposition of fine grain material and resulting grain growth. This trade-off in conventional HPHT conditions may produce less inter-granular bonding than desired and more material dissolution and redeposition than desired.

BRIEF SUMMARY

Embodiments of the present methods may accommodate formation of a polycrystalline compact structure having an optimized microstructure with high hard-material density and improved thermal stability.

Disclosed is a method for forming a cutting element comprising a polycrystalline material supported by a supporting substrate. The method comprises introducing coarse grains of a hard material, fine grains of the hard material, and a catalyst material to a press. A system temperature is elevated to a plateau temperature. A system pressure is elevated to a plateau pressure. The system temperature is spiked from the plateau temperature to a peak temperature, and the system temperature is lowered from the peak temperature to the plateau temperature.

Also disclosed is a method for forming a polycrystalline compact comprising grains of a hard material. The method comprises elevating to a plateau temperature a system temperature to which the grains are subjected. A system pressure, to which the grains are subjected, is elevated to a plateau pressure. At least one of the system temperature and the system pressure is spiked to form inter-granular bonds between the grains.

Also disclosed is a polycrystalline compact comprising grains of a hard material inter-granularly bonded to one another by elevating a temperature to which the grains are subjected, elevating a pressure to which the grains are subjected, and spiking at least one of the temperature and the pressure to which the grains are subjected.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

Figure 1:
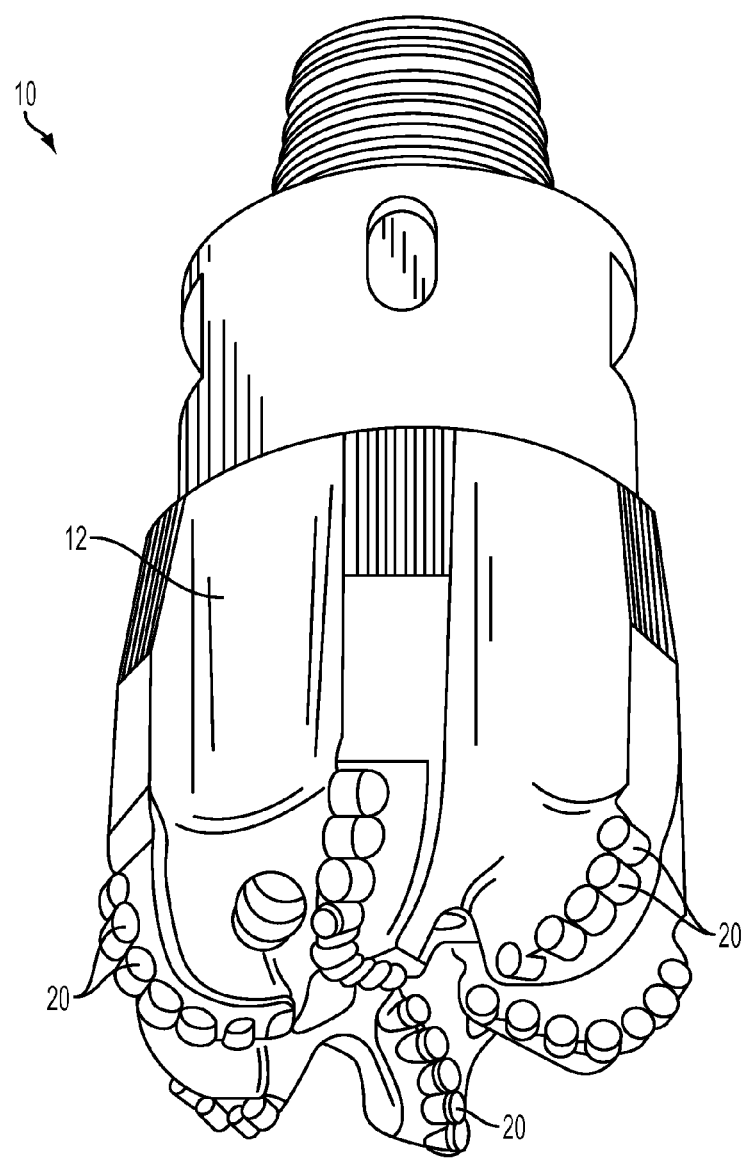
FIG. 1 is a perspective view of a fixed-cutter earth-boring rotary drill bit that includes cutting elements according to an embodiment of the present disclosure.

Methods for forming cutting elements, methods for forming polycrystalline compacts, and related polycrystalline compacts are disclosed. In embodiments of the present methods, at least one quick spike of one or both of the system pressure or power (and, therefore, temperature) during an otherwise plateaued temperature and/or pressure stage is utilized to provide at least one quick, elevated temperature and/or pressure condition that accommodates formation of inter-granular bonds, such as diamond-to-diamond bonds. The quick, elevated conditions are not maintained for a substantial period of time, which avoids accommodating unwanted dissolution and redeposition of hard material. Therefore, embodiments of the method may use maximized temperature and/or pressure conditions of minimized duration to accomplish increased inter-granular bond formation, as compared to a conventional HPHT process, without promoting substantial grain growth. The resulting table for the polycrystalline compact may therefore include a high density of the hard material (e.g., diamond) and require a minimized amount of catalyst material, thereby providing improved thermal stability, wear resistance, toughness, and behavior during use of the polycrystalline compact for drilling.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits, and other drilling bits and tools known in the art.

As used herein, the term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "polycrystalline compact" means and includes any structure comprising a polycrystalline material formed by a process that involves application of pressure (e.g., compaction) to the precursor material (or materials) used to form the polycrystalline material.

As used herein, the term "hard material" means and includes any material having a Knoop hardness value of about 2,000 Kg/mm$^2$ (20 GPa) or more. In some embodiments, the hard materials employed herein may have a Knoop hardness value of about 3,000 Kg/mm$^2$ (29.4 GPa) or more. Such materials include, for example, diamond and cubic boron nitride.

As used herein, the term "inter-granular bond" means and includes any direct atomic bond (e.g., ionic, covalent, metallic, etc.) between atoms in adjacent grains of hard material.

As used herein, the term "catalyst material" refers to any material that is capable of substantially catalyzing the formation of inter-granular bonds between grains of hard material during an HPHT process. For example, catalyst materials for diamond include cobalt, iron, nickel, other elements from Group VIIIA of the Period Table of Elements, and alloys thereof.

As used herein, the term "non-catalytic material" refers to any material that is not a catalyst material.

As used herein, the term "nanoparticles," and "nano-" when referring to any material, means and includes any particle or material, respectively, having an average particle diameter of about 500 nm or less.

As used herein, the term "non-catalytic nanoparticles" means and includes any nanoparticle that does not comprise a catalytic material, diamond, or cubic boron nitride. Non-catalytic nanoparticles, in some embodiments, may comprise materials that are not any type of hard material, as defined above.

Figure 14:
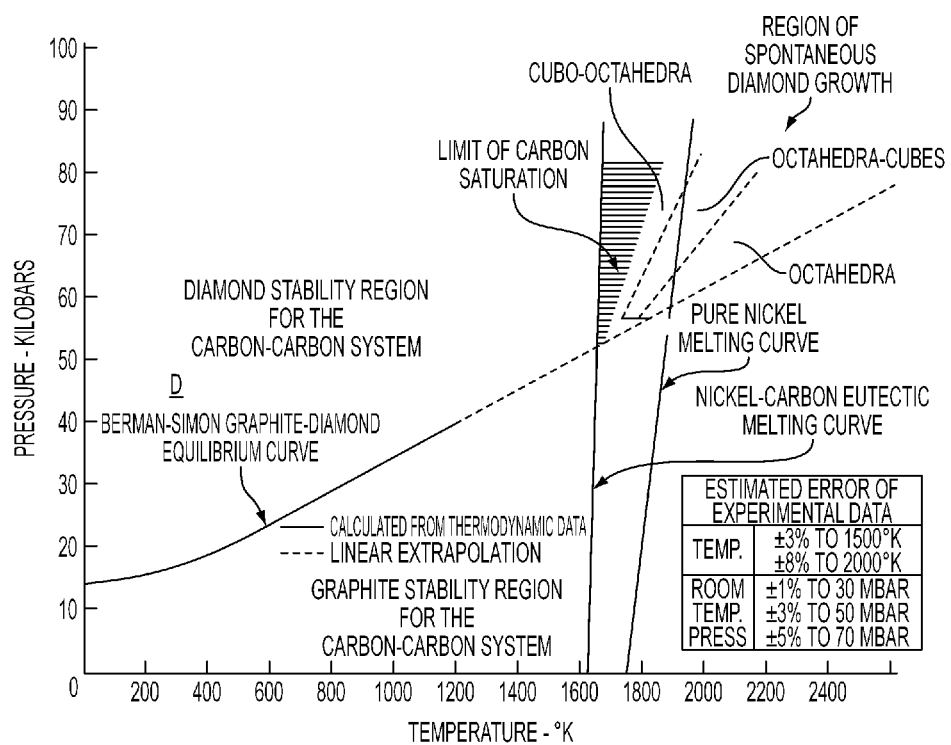
FIG. 14 is a carbon phase diagram.

As used herein, the term "change point" means and includes a pressure and temperature condition or a pressure and input-power condition at which a particular material tends to transition from one state to another (e.g., solid to liquid, liquid to solid) or from one phase to another (e.g., cubic crystalline structure to hexagonal crystalline structure). For a known material, phase change temperatures at a given pressure are generally known in the art. Similarly, for the known material, phase change pressures at a given temperature are generally known in the art. As such, for a given material, one may generally predict at what temperature the material will change phases or states for a given pressure. Similarly, for the given material at a known temperature, one may generally predict at what pressure the material will change phases or states. For example, a carbon phase diagram is shown in FIG. 14 (as disclosed and discussed in U.S. Patent Application Publication 2010/0243337, filed Mar. 31, 2010, the disclosure of which is hereby incorporated herein by reference in its entirety). It illustrates the various phases of carbon, including the diamond stable phase D, and the temperatures and pressures within which such phases exist. For purposes of this disclosure, points along the Berman-Simon Graphite-Diamond Equilibrium Curve and other phase or state change lines within the diagram define "change points."

As used herein, the term "spiking," when referring to a change in a pressure, power, or temperature condition, means and includes elevating the identified condition to a peak level at a quick rate, compared to a condition-raising rate used in the HPHT process to bring the condition to a plateau level, and then lowering the condition from the peak level, or allowing the condition to lower from the peak level back to the plateau level. Spiking, as used herein, produces a condition profile in which the duration of the quickly elevated and then lowered condition, i.e., a "spike," is accomplished within a duration of less than about five minutes, e.g., less than about one minute, e.g., less than about thirty seconds. Spiking also means and includes a condition elevation and subsequent lowering that produces a condition profile defining, during the spiking, a single maximum point either not held or held for less than about one minute, e.g., less than about thirty seconds. It is contemplated that spiking defines a spike interrupting an otherwise plateaued stage of the condition profile.

The illustrations presented herein are not actual views of any particular drill bit, cutting element, component thereof, or real-data graph of temperature versus time or pressure versus time. Rather, they are merely idealized representations that are employed to describe embodiments of the present disclosure.

FIG. 1 illustrates a fixed-cutter type earth-boring rotary drill bit 10 that includes a bit body 12 and cutting elements 20. The cutting elements 20 may be formed in accordance with any of the methods described herein.

Figure 2:
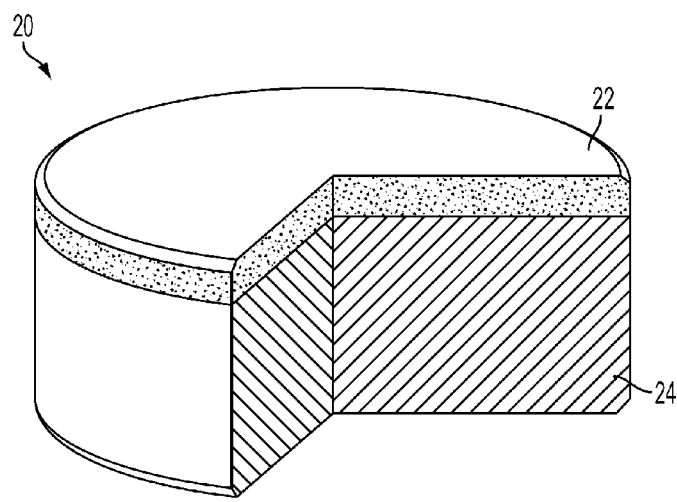
FIG. 2 is a partial cut-away perspective view illustrating an embodiment of a cutting element comprising a polycrystalline compact of the present disclosure.

FIG. 2 is a simplified, partial cut-away perspective view of an embodiment of a cutting element 20 of the present disclosure. The cutting element 20 comprises a polycrystalline compact in the form of a layer of polycrystalline material 22, also known in the art as a "polycrystalline table," that is provided on (e.g., formed on or attached to) a supporting substrate 24 with an interface therebetween. Though the cutting element 20 in the embodiment depicted in FIG. 2 is cylindrical or disc-shaped, in other embodiments, the cutting element 20 may have any desirable shape, such as a dome, cone, chisel, etc. Furthermore, in some embodiments, the cutting element 20 may consist of a volume of polycrystalline material 22 that is not disposed on any substrate.

In some embodiments, the polycrystalline material 22 comprises diamond. In such embodiments, the cutting element 20 may be referred to as a polycrystalline diamond compact (PDC) cutting element. In other embodiments, the polycrystalline material 22 may comprise another hard material such as, for example, polycrystalline cubic boron nitride.

The composition of the supporting substrate 24 to which the table of polycrystalline material 22 is attached may be the same as or similar to that of conventional substrates. In some embodiments, the supporting substrate 24 may have a composition the same as or similar to the composition of the polycrystalline material 22 of the table to be formed.

Figure 3:
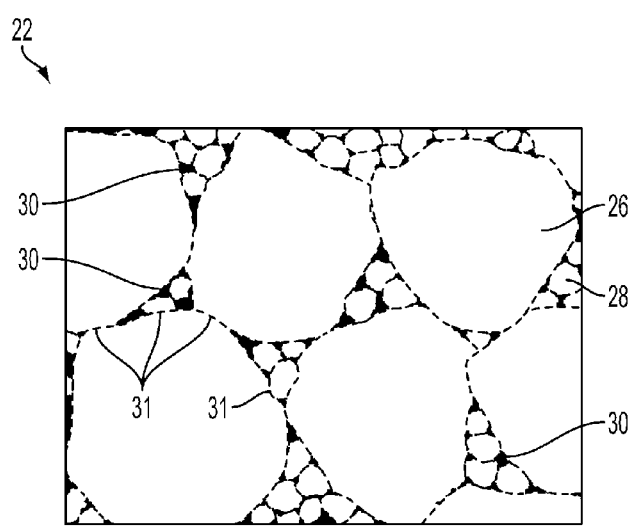
FIG. 3 is a simplified drawing showing how a microstructure of the polycrystalline compact of FIG. 2 may appear under magnification and illustrating interbonded and interspersed coarse and fine grains of hard material.

FIG. 3 is an enlarged view illustrating how a microstructure of the polycrystalline material 22 of the cutting element 20 (FIG. 2) may appear under magnification. The polycrystalline material 22 includes interbonded grains of hard material. The hard grains of material include both coarse grains 26 and fine grains 28 of hard material. The coarse grains 26 are larger than the fine grains 28. In other embodiments, more than two general sizes of interbonded grains may be included in the polycrystalline material 22.

The fine grains 28 may be nanoparticles disposed in interstitial spaces between the interbonded coarse grains 18 of hard material. These nanoparticulate inclusions in the polycrystalline material 22 may minimize an amount of catalyst material 30 remaining in the polycrystalline material 22 after the catalyst material 30 is used to catalyze formation of the polycrystalline material 22 in a sintering process, such as an HPHT process. In other words, at least substantially non-catalytic nanoparticulate inclusions (i.e., nanoparticles) may be incorporated into the polycrystalline material 22 such that the amount of catalyst material 30 remaining in the interstitial spaces between interbonded coarse grains 26 of hard material and between the interbonded coarse grains of hard material and the fine grains 28 of hard material in the microstructure after the sintering process (i.e., the HPHT process) is reduced by volumetric exclusion based on the presence of the non-catalyst nanoparticles.

The nanoparticle fine grains 28 of hard material may comprise non-catalytic material. For example, the nanoparticles fine grains 28 may comprise nanoparticles of diamond material, which may otherwise be referred to as "nanodiamond material" or "nanodiamond."

As shown in FIG. 3, the grains (e.g., coarse grains 26 and fine grains 28) of the polycrystalline material 22 optionally may have a multi-modal (e.g., bi-modal, tri-modal, etc.) grain size distribution. In some embodiments, the polycrystalline material 22 may comprise a multi-modal grain size distribution as disclosed in at least one of Provisional U.S. Patent Application Ser. No. 61/232,265, filed Aug. 7, 2009, entitled "Polycrystalline Compacts Including In-Situ Nucleated Grains, Earth-Boring Tools Including Such Compacts, and Methods of Forming Such Compacts and Tools"; U.S. patent application Ser. No. 12/852,313, filed Aug. 6, 2010, published Feb. 10, 2011, as U.S. Patent Application Publication 2011/0031034, entitled "Polycrystalline Compacts Including In-Situ Nucleated Grains, Earth-Boring Tools Including Such Compacts, and Methods of Forming Such Compacts and Tools"; and U.S. patent application Ser. No. 12/558,184, filed Sep. 11, 2009, published Mar. 17, 2011, as U.S. Patent Application Publication 2011/0061942, entitled "Polycrystalline Compacts Having Material Disposed in Interstitial Spaces Therein, Cutting Elements and Earth-Boring Tools Including Such Compacts, and Methods of Forming Such Compacts," the disclosure of each of which is incorporated herein in its entirety by this reference.

For example, the layer of hard polycrystalline material 22 (FIG. 2) may include a first plurality of grains of hard material having a first average grain size and at least a second plurality of grains of hard material having a second average grain size that differs from the first average grain size of the first plurality of grains. The second plurality of grains may be larger than the first plurality of grains. For example, the second plurality of grains may comprise coarse grains 26, and the first plurality of grains may comprise fine grains 28. For example, the average grain size of the larger grains, i.e., the coarse grains 26, may be at least about one hundred fifty (150) times greater than the average grain size of the smaller grains, i.e., the fine grains 28. In additional embodiments, the average grain size of the coarse grains 26 may be at least about five hundred (500) times greater than the average grain size of the fine grains 28. In yet further embodiments, the average grain size of the larger, coarse grains 26 may be at least about seven hundred fifty (750) times greater than the average grain size of the smaller, fine grains 28.

The fine grains 28 and the coarse grains 26 may be interspersed and interbonded to form the layer of hard polycrystalline material 22. In embodiments in which the polycrystalline material 22 comprises polycrystalline diamond, the smaller, fine grains 28 and the larger, coarse grains 26 may be mixed together and bonded directly to one another by inter-granular bonds 31, which may be diamond-to-diamond bonds (represented by dashed lines in FIG. 3).

The formation of the inter-granular bonds 31 may be encouraged by subjecting the components of the polycrystalline material 22 to be formed to high-pressure and/or high-temperature conditions. Often, the inter-granular bonds 31 form when the components of the cutting element 20 (FIG. 2) are compressed during production in an HPHT process (i.e., a sintering process).

Some embodiments of the method may further include use of nano-additives in the table to be formed. Such nano-additives may function as nucleation sources, encouraging formation of smaller grains of the hard material that can then be inter-granularly bonded to larger grains of the hard material. U.S. patent application Ser. No. 12/852,313, filed Aug. 6, 2010, published Feb. 10, 2011, as U.S. Patent Application Publication 2011/0031034, entitled "Polycrystalline Compacts Including In-Situ Nucleated Grains, Earth-Boring Tools Including Such Compacts, and Methods of Forming Such Compacts and Tools," the disclosure of which is hereby incorporated by reference in its entirety, describes some such methods using nano-additives.

Figure 4:
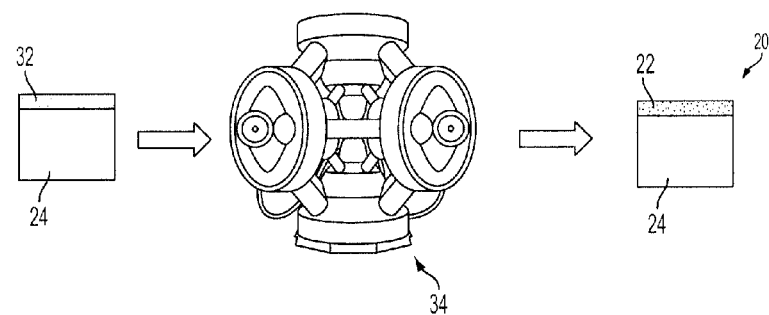
FIG. 4 is a simplified process flow illustration of a one-step HPHT process for forming a cutting element according to an embodiment of the present disclosure.
Figure 5:
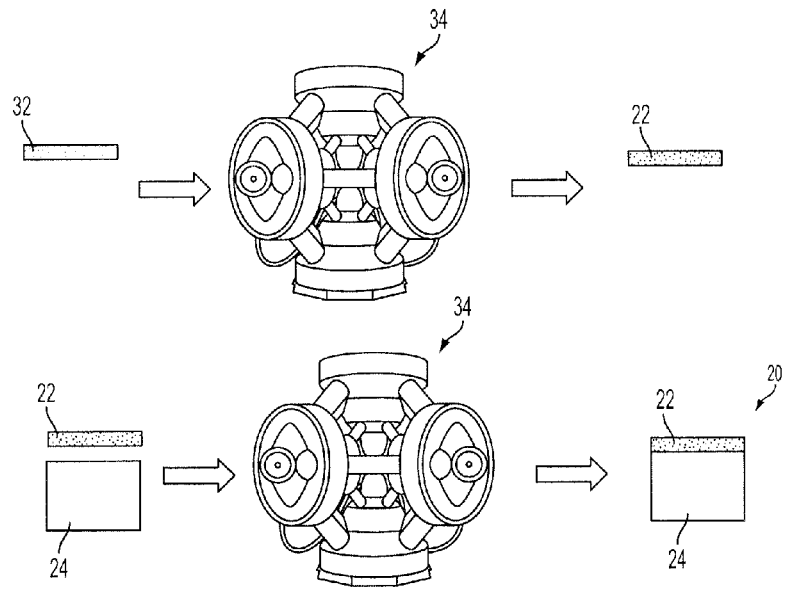
FIG. 5 is a simplified process flow illustration of a two-step HPHT process for forming a cutting element according to an embodiment of the present disclosure.

As illustrated in FIGS. 4 and 5, embodiments of the present methods may be used to form polycrystalline compacts for cutting elements 20 by forming a table of the polycrystalline material 22 on the supporting substrate 24 (e.g., FIG. 4), by forming the table of the polycrystalline material 22 and then later attaching the formed table of the polycrystalline material 22 to the supporting substrate 24 (e.g., FIG. 5), or by attaching a previously-sintered table of polycrystalline material 22 to the supporting substrate 24 (e.g., second step of FIG. 5).

FIG. 4 illustrates a one-step HPHT process in which cutting elements are formed. As shown, hard-material feed 32, e.g., a diamond feed or other hard-material crystal feed, to be included in the polycrystalline material 22 to be formed, and a supporting substrate 24 are subjected to a press 34. In some embodiments, nano-level precipitates of catalyst may be included in the pre-mixed, hard-material feed 32. In some such embodiments, the nano-level precipitates of catalyst may have also been included in a feed for formation of the supporting substrate 24. Methods of adding extremely well-dispersed catalyst in the hard-material feed 32 may be utilized to form the polycrystalline material 22, the supporting substrate 24, or both.

The press 34 is illustrated as a cubic press. Such a cubic press may be responsive to changes in process parameters (e.g., pressure, power) even when the process is used with low mass amounts. Alternatively, the process may be performed using a belt press, such as a "small" belt press configured for use with lower mass amounts and operable with shorter cycle times than conventional larger belt presses configured for use with larger masses and longer cycle times. In other embodiments, a toroid press may be used.

In the press 34, the hard-material feed 32 and the supporting substrate 24 are subjected to elevated pressures and temperatures to form the polycrystalline material 22 of a polycrystalline compact structure. The resulting, compressed article, i.e., the cutting element 20, includes a table of polycrystalline material 22 connected to the supporting substrate 24.

FIG. 5 illustrates a two-step HPHT process, which may be utilized as an alternative to the one-step HPHT process of FIG. 4. As shown, the hard-material feed 32, e.g., diamond material feed, is subjected to HPHT conditions in the press 34. In the press 34, the hard-material feed 32 is subjected to elevated pressures and temperatures, the result of which is the formation of the polycrystalline material 22 table. Where the hard material within the polycrystalline material 22 is diamond, the table may be referred to as a "diamond table." The polycrystalline material 22 and the supporting substrate 24 are then both subjected, together, to the press 34, again, to form the cutting element 20, which includes the polycrystalline material 22 atop and bonded to the supporting substrate 24.

The second illustrated stage of FIG. 5 may be utilized with a previously sintered table of polycrystalline material 22 to bond the previously sintered table of polycrystalline material 22 to the supporting substrate 24. Thus, one supporting substrate 24 may be used to support one table of polycrystalline material 22 and may later be used to support a new table of polycrystalline material 22. Likewise, one table of polycrystalline material 22 may be supported by one supporting substrate 24 and later be detached from the first supporting substrate 24 and re-bonded to a new supporting substrate 24, using the second illustrated stage of FIG. 5. In such embodiments, the original supporting substrate 24 and the new supporting substrate 24 may have the same or similar composition.

Figure 6:
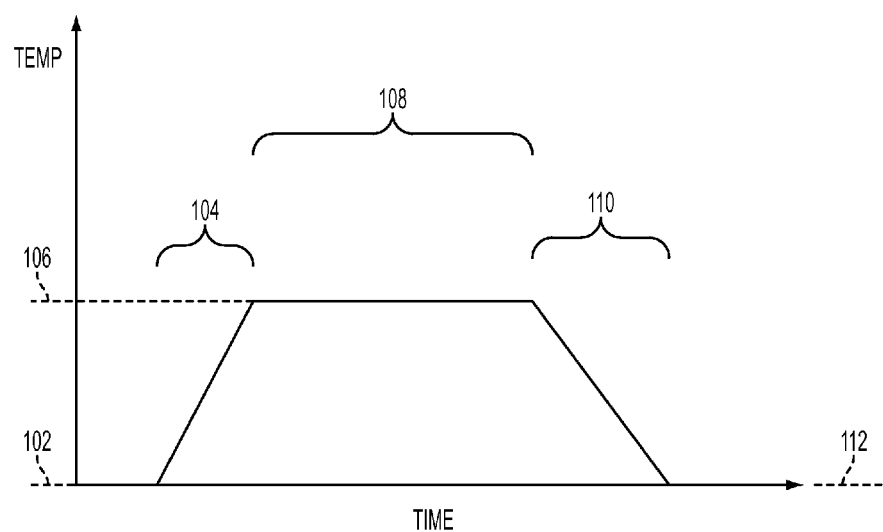
FIG. 6 is a temperature profile of a conventional HPHT process for forming a cutting element.
Figure 7:
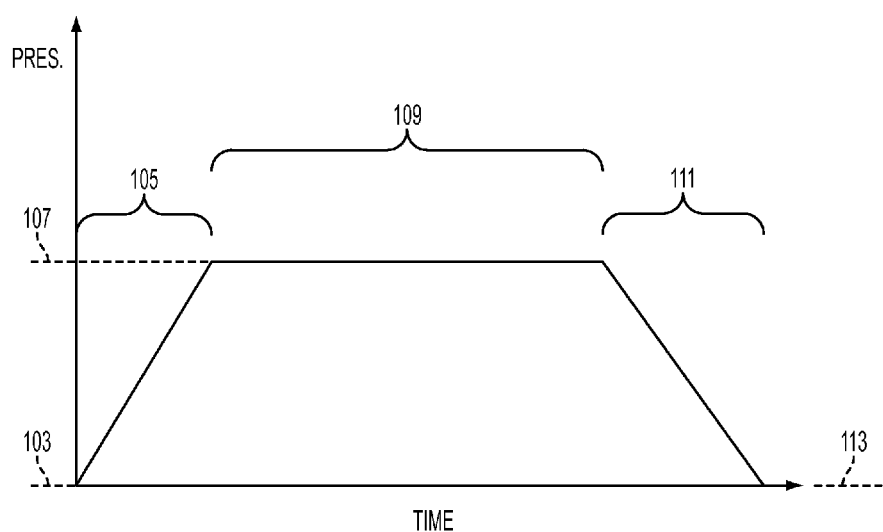
FIG. 7 is a pressure profile of a conventional HPHT process for forming a cutting element.

With reference to FIGS. 6 and 7, illustrated are graphs of temperature and pressure profiles of system conditions during an HPHT process. No particular temperature, pressure, or time scale is included with FIGS. 6 and 7 because the graphs are meant to depict relative conditions from one period of time to another. (The same applies to all other temperature profiles and pressure profiles discussed herein.) FIGS. 6 and 7 are graphed over the same hypothetical time period. Therefore, conditions half-way along the TIME axis of FIG. 6 represent the temperature (i.e., TEMP) conditions half-way during a hypothetical HPHT process while conditions half-way along the TIME axis of FIG. 7 represent the pressure (i.e., PRES.) conditions at the same half-way period of time of FIG. 6. (The same applies to all other pairs of temperature profiles and pressure profiles discussed herein.)

The temperature, the pressure, or both the temperature and pressure of an HPHT system may be adjusted directly or indirectly and may or may not be monitored during the HPHT process. For example, the system temperature may be adjusted by controlling a level of power input such that increasing power yields an increase in system temperature. The temperature may not be directly monitored. After all, extreme temperatures in an HPHT system may not be easily detectable or attempting to detect such temperature may inhibit other parameters of the system. Therefore, it is contemplated that illustrated temperature profiles may be accomplished by means of adjusting power input levels, rather than by adjusting settings of a thermostat, or the like.

As graphed in the temperature profile of FIG. 6, according to a conventional HPHT process, components of a cutting element to be formed are introduced to a press 34 (FIG. 4 or 5) at an initial temperature 102. The initial temperature 102 may be below the diamond stable region (see FIG. 14). The initial temperature 102 may be room temperature. Once in the press 34 (FIG. 4 or 5), the temperature to which the components are subjected is gradually increased, e.g., by adjusting system power input, over a temperature raising stage (stage 104) to a plateau temperature 106. The plateau temperature 106 may be in the range of about 1,400° C. to about 1,500° C. The plateau temperature 106 may be maintained at a steady temperature for a substantial period of time during a temperature plateau stage (stage 108). The temperature plateau stage (stage 108) may be carried out for several minutes or longer. Thereafter, the temperature may be dropped during a temperature dropping stage (stage 110) to a final temperature 112. The final temperature 112 may be about equal to the initial temperature 102. The final temperature 112 may be well below the diamond stable region (see FIG. 14).

As graphed in the pressure profile of FIG. 7, according to the same conventional HPHT process graphed in FIG. 6, components of the cutting element to be formed are also subjected to elevated pressures. The components are introduced to the press 34 (FIG. 4 or 5) at an initial pressure 103. The initial pressure 103 may be atmospheric pressure. Pressure is increased to a plateau pressure 107 during a pressure raising stage (stage 105). As depicted, the pressure raising stage (stage 105) may be initiated before the temperature raising stage (stage 104) (FIG. 6) is initiated. The plateau pressure 107 may be in the range of about 5.0 GPa to about 6.0 GPa. The plateau pressure 107 may be maintained at a steady pressure during a pressure plateau stage (stage 109) for a duration of time (e.g., several minutes or longer) and thereafter be dropped during a pressure dropping stage (stage 111) to a final pressure 113. The final pressure 113 may be about equal to the initial pressure 103. The duration of the pressure plateau stage (stage 109) may not be equal to the duration of the temperature plateau stage (stage 108) (FIG. 6). However, the two plateau stages (stages 109 and 108) may coincide or overlap. Likewise, the duration of the pressure dropping stage (stage 111) may not be equal to the duration of the temperature dropping stage (stage 110) (FIG. 6).

Subjecting the components of the cutting element to be formed to the high pressures and high temperatures of the HPHT sintering process may encourage formation of intergranular bonds and results in formation of a microstructure that exhibits certain properties. It may be ideal to form, with the HPHT process, a polycrystalline material with a maximum amount of inter-granular bonded hard material and a minimal amount of interstitial space between grains of hard material within the resulting polycrystalline material. However, subjecting fine grains of hard material to increased pressures and temperatures for extended periods can also result in dissolution of the fine grains into a catalyst material. The dissolved hard material may later precipitate out from the hard material-catalyst solution, and, in doing so, may tend to form on larger grains of the hard material or on non-dissolved smaller grains of the hard material. The reformation may lead to larger grain sizes, which may alter the microstructure of the polycrystalline material and therefore alter the properties of the polycrystalline material.

In accordance with embodiments of the present disclosure, HPHT processes for forming a cutting element 20 (FIG. 2) may include a short spike of increased temperature and/or increased pressure. Subjecting the components of the cutting element 20 (FIG. 2) to be formed to an elevated temperature and/or pressure for only a short duration of time may promote formation of desired inter-granular bonds 31 (FIG. 3) while avoiding undesirable dissolution of fine grains 28 (FIG. 3) into the catalyst material 30 (FIG. 3) and subsequent grain growth. Further, spiking the temperature or pressure to encourage formation of inter-granular bonds 31 (FIG. 3) may allow use of a plateau temperature or plateau pressure, respectively, that is lower than a conventional plateau temperature 106 (FIG. 6) or conventional plateau pressure 107 (FIG. 7), respectively.

Figure 8:
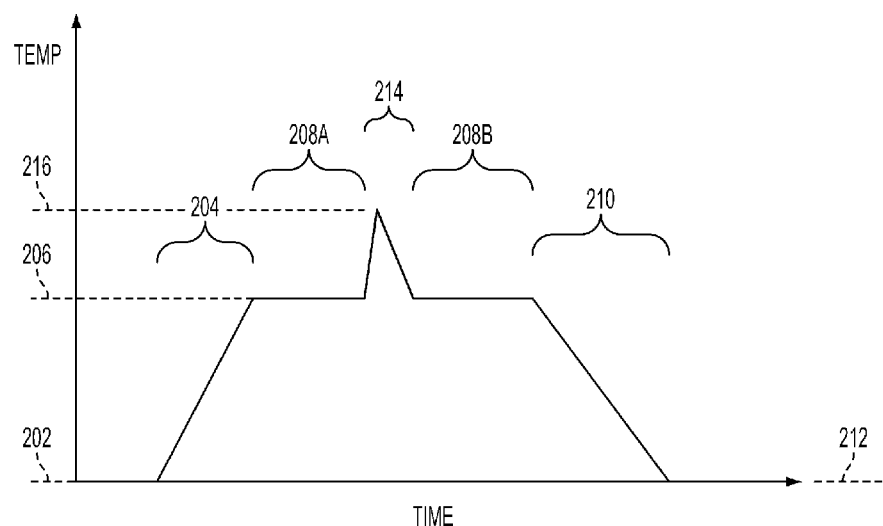
FIG. 8 is a temperature profile of an HPHT process for forming a cutting element according to an embodiment of the present disclosure, wherein a system temperature is spiked while a plateau pressure is maintained.
Figure 9:
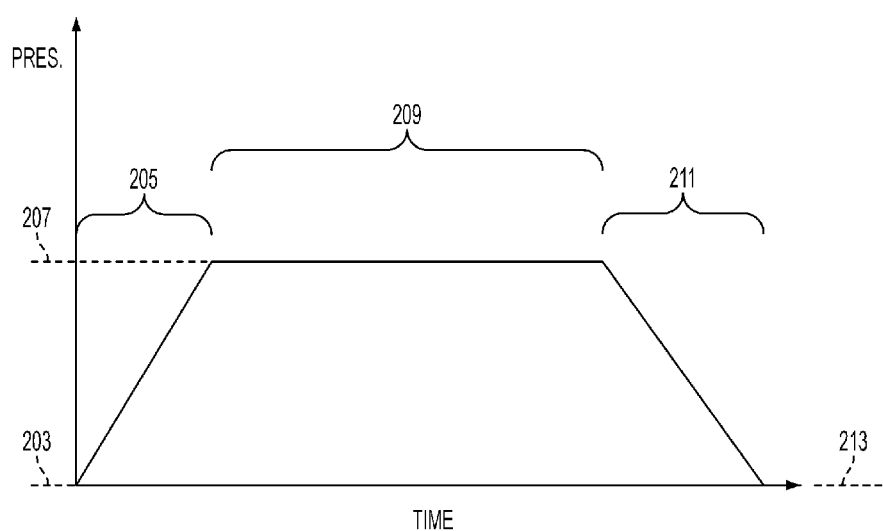
FIG. 9 is a pressure profile of the embodiment of FIG. 8.

With reference to FIGS. 8 and 9, graphed are a temperature profile (FIG. 8) and pressure profile (FIG. 9) according to a first embodiment of the disclosure. As with a conventional process (FIGS. 6 and 7), the components (e.g., a hard-material feed 32, a hard-material feed 32 and supporting substrate 24, or a polycrystalline material 22 and supporting substrate 24 (FIGS. 4 and 5)) are introduced to a press 34 at an initial temperature 202 and an initial pressure 203. The temperature is increased to a plateau temperature 206 over a duration of time during a temperature raising stage (stage 204), and the pressure is increased to a plateau pressure 207 over a duration of time during a pressure raising stage (stage 205). The plateau temperature 206 may be about the same as the plateau temperature 106 (FIG. 6) of a conventional HPHT process or may be lower. The plateau pressure 207 may be about the same as the plateau pressure 107 (FIG. 7) of a conventional HPHT process or may be lower.

After maintaining the system at the plateau temperature 206 during a first temperature plateau stage (stage 208A) and while maintaining the system at the plateau pressure 207 during a pressure plateau stage (stage 209), the temperature of the system is quickly spiked to a peak temperature 216 and then quickly lowered back to the plateau temperature 206 during a temperature spike stage (stage 214). The rate of elevating the system temperature from the plateau temperature 206 to the peak temperature 216 may be faster than the rate of lowering the system temperature from the peak temperature 216 back to the plateau temperature 206. In other embodiments, the elevating rate and the lowering rate may be about equal, such that the profile of the spike during the temperature spike stage (stage 214) is about symmetrical along an axis parallel to the TEMP axis. In still other embodiments, the elevating rate may be slower than the lowering rate. In other embodiments, the elevating and the lowering may define a curved temperature profile in the temperature spike stage (stage 214).

The difference between the plateau temperature 206 and the peak temperature 216 may be greater than about 100° C. (e.g., greater than about 100° C. to about 300° C., e.g., greater than about 100° C. to about 150° C.). The temperature spike stage (stage 214) may be carried out and completed within less than about one minute. For example, the plateau temperature 206 may be in the range of about 1400° C. to about 1500° C., and the temperature may be spiked to a peak temperature 216 in a range of about 1500° C. to about 1800° C. (e.g., a range of about 1500° C. to about 1600° C.), for a total duration of the temperature spike stage (stage 214) of about one second to about thirty seconds.

In some embodiments, the HPHT process may be run at a plateau pressure 207 elevated from that of conventional processes, e.g., above about 6.0 GPa.

The temperature of the HPHT process may be raised by increasing the power of the system. The temperature spike stage (stage 214) may be accomplished by, after applying power for a first time period, as during the first temperature plateau stage (stage 208A), spiking the power, e.g., for less than about one minute, to create a quick spike in the temperature of the system. The increased temperature again, may be quickly lowered back to about a conventional plateau temperature. A spike in the power, and therefore the temperature, of the system during the HPHT process, which may be otherwise referred to as a sintering cycle, may lead to increased inter-granular bonding, e.g., diamond-to-diamond bonding. With nano-enhanced feeds (e.g., hard-material feed 32 (FIGS. 4 and 5)) or highly bi-modal mixes, a much improved microstructure with a high density of hard material (i.e., high density of diamond or, otherwise, a high density of the collection of coarse grains 26 (FIG. 3) and fine grains 28 (FIG. 3)), lower catalyst density (i.e., lower catalyst material 30 (FIG. 3) density), and improved thermal stability, wear resistance, toughness, and behavior may be achieved.

After the temperature spike stage (stage 214) and the return to the plateau temperature 206, the HPHT system may be maintained at the plateau temperature 206 for a duration of time during a second temperature plateau stage (stage 208B), while the pressure of the system is maintained at the plateau pressure 207 in the continuing pressure plateau stage (stage 209). Thereafter, the temperature may be lowered in a temperature dropping stage (stage 210) to a final temperature 212, which may be about equal to the initial temperature 202, while the pressure is lowered in a pressure dropping stage (stage 211) to a final pressure 213, which may be about equal to the initial pressure 203. As with the conventional process (FIGS. 6 and 7), the initiation time of and duration of the temperature raising stage (stage 204) may not be the same as the initiation time and duration of the pressure raising stage (stage 205); the initiation time of and total duration of the first temperature plateau stage (stage 208A), the temperature spike stage (stage 214), and the second temperature plateau stage (stage 208B) may not be the same as the initiation time and duration of the pressure plateau stage (stage 209); and the initiation time of and duration of the temperature dropping stage (stage 210) may not be the same as the initiation time and duration of the pressure dropping stage (stage 211).

The plateau temperature 206 of the system may be at a slightly lower temperature than the plateau temperature 106 (FIG. 6) of a conventional process, and the plateau pressure 207 of the system may be at a somewhat higher pressure than the plateau pressure 107 (FIG. 7) of a conventional process. In other embodiments, the plateau pressure 207 of the system may be equal to, or somewhat lower than, the plateau pressure 107 (FIG. 7) of a conventional process. The peak temperature 216 may be higher than a maximum temperature achieved in a conventional HPHT process. The temperature spike stage (stage 214) and peak temperature 216 may be selected to induce inter-granular bonding. The short duration of the peak temperature 216 may be configured to accommodate formation of inter-granular bonds 31 (FIG. 3) without accommodating dissolution of fine grains 28 (FIG. 3) of hard material into the catalyst material 30 (FIG. 3) with subsequent precipitation of the hard material onto non-dissolved grains, i.e., grain growth.

Figure 10:
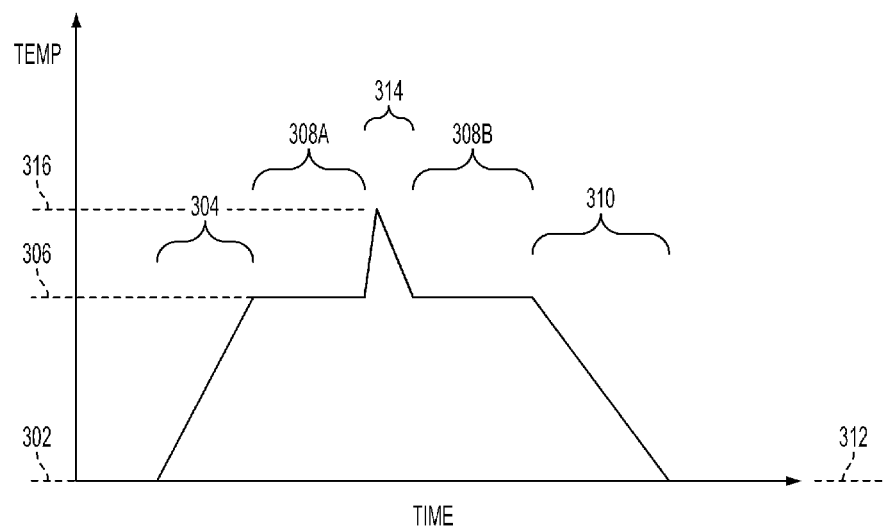
FIG. 10 is a temperature profile of an HPHT process for forming a cutting element according to another embodiment of the present disclosure, wherein both a system temperature and a system pressure are spiked.
Figure 11:
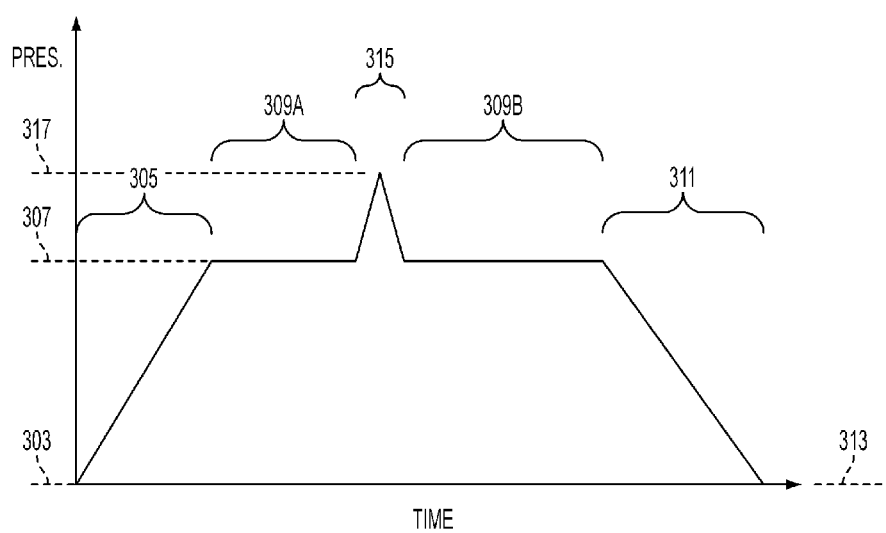
FIG. 11 is a pressure profile of the embodiment of FIG. 10.

According to an alternative embodiment, both pressure and power (and therefore, temperature) are spiked to produce a rapid sintering (i.e., inter-granular bonding) at elevated conditions during an otherwise essentially flat plateau stage. With reference to FIGS. 10 and 11, such a second embodiment is graphed. The process of this second embodiment may be similar to that of the first embodiment, with the descriptions thereof similar to the description of FIGS. 8 and 9, as, for example, with regard to the initial temperature 302, the initial pressure 303, the temperature raising stage (stage 304), the pressure raising stage (stage 305), the plateau temperature 306, the plateau pressure 307, the first temperature plateau stage (stage 308A), the second temperature plateau stage (stage 308B), the temperature dropping stage (stage 310), the pressure dropping stage (stage 311), the final temperature 312, the final pressure 313, the temperature spike stage (stage 314), and the peak temperature 316. According to this second embodiment, the process also includes a pressure spike stage (stage 315) in which the pressure of the system is quickly elevated above the plateau pressure 307, to a peak pressure 317, and then returned to the plateau pressure 307, such that a pressure profile similar to the conventional pressure plateau stage (stage 109) (FIG. 7) is split into a first pressure plateau stage (stage 309A) and a second pressure plateau stage (stage 309B) on either side of the pressure spike stage (stage 315). During the pressure spike stage (stage 315), the rate of elevating the pressure may be about equal to the rate of lowering the pressure. In other embodiments, during the pressure spike stage (stage 315), the rate of elevating the pressure may be greater than the rate of lowering the pressure. In still other embodiments, during the pressure spike stage (stage 315), the rate of elevating the pressure may be less than the rate of lowering the pressure.

Though FIGS. 10 and 11 depict the temperature spike stage (stage 314) as initiating at the same time and for the same duration as the pressure spike stage (stage 315), in other embodiments, the pressure spike stage (stage 315) may be initiated prior to the initiation of the temperature spike stage (stage 314) and continue for a longer duration than the temperature spike stage (stage 314), such that the system would return to the plateau pressure 307 after the system has already returned to the plateau temperature 306.

The peak pressure 317 of the system may be in a range of about 1.5 GPa to about 10.GPa (e.g., in a range of about 1.5 GPa to about 4.0 GPa), or more, higher than the plateau pressure 307. For example, the plateau pressure 307 may be in a range of about 5.0 GPa to about 8.0 GPa (e.g., in the range of about 5.0 GPa to about 6.0 GPa), and the peak pressure 317 may be in a range of about 6.5 GPa to about 15.0 GPa (e.g., in the range of about 6.5 GPa to about 10.0 GPa), respectively. The duration of the pressure spike stage (stage 315) may be less than one minute.

Figure 12:
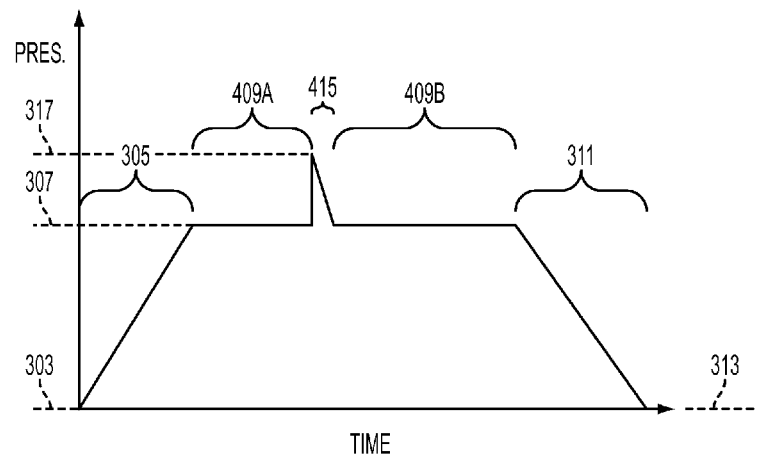
FIG. 12 is a pressure profile of an HPHT process for forming a cutting element according to another embodiment of the present disclosure, wherein a system pressure is spiked by elevating the pressure at a faster rate than the rate at which the pressure is subsequently lowered to a plateau pressure.

With reference to FIG. 12, in other embodiments, the rate of increasing the system pressure, after a first pressure plateau stage (stage 409A), from the plateau pressure 307 to the peak pressure 317 may be almost immediate, with the system pressure lowering more steadily thereafter back to the plateau pressure 307. As such, a profile of the pressure spike stage (stage 415) may define more of a right angle between the first pressure plateau stage (stage 409A) and the pressure spike stage (stage 415). It is contemplated that a method embodying a pressure profile such as that illustrated in FIG. 12 may also embody a temperature profile such as that illustrated in any of FIGS. 6, 8, and 10.

In still other embodiments, multiple spikes of temperature and/or pressure may be utilized. In some such embodiments, the temperature and/or pressure may be adjusted to create an oscillating temperature and/or pressure profile. Such oscillations may move the conditions of the system successively back and forth through change points of the system to take advantage of the hard material's tendency to alter phases at change points.

Figure 13:
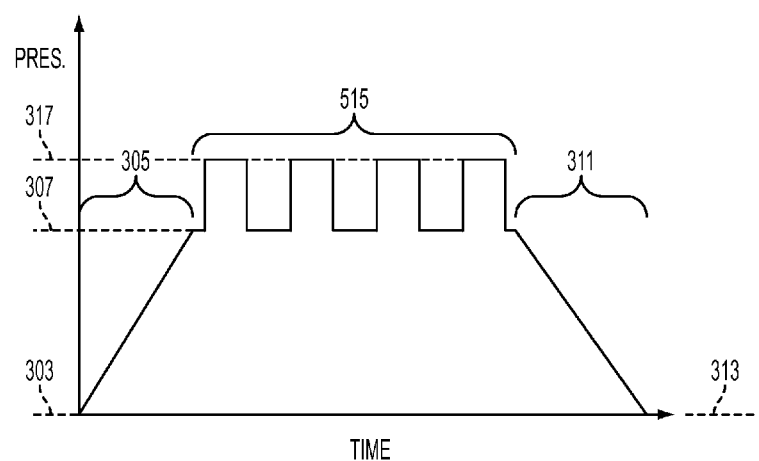
FIG. 13 is a pressure profile of an HPHT process for forming a cutting element according to another embodiment of the present disclosure, wherein a system pressure is oscillated between a plateau pressure and a peak pressure.

With reference to FIG. 13, illustrated is a pressure profile incorporating pressure oscillations. The pressure may be oscillated between the plateau pressure 307 and the peak pressure 317. Each oscillation presents a pressure spike during a pressure spike oscillation stage (stage 515). The pressure oscillations may present rectangular waves, such as those illustrated in FIG. 13, or, alternatively, may present sine waves, damped waves, square waves, sawtooth waves, triangle waves, or other waveforms. It is contemplated that a method embodying a pressure profile such as that illustrated in FIG. 13 may also embody a temperature profile such as that illustrated in any of FIGS. 6, 8, and 10. Alternatively or additionally, the associated temperature profile may incorporate oscillations between the temperature raising stage (stage 204 (FIG. 8), 304 (FIG. 10)) and the temperature dropping stage (stage 210 (FIG. 8), 310 (FIG. 10)).

In one embodiment utilizing pressure oscillations, a modulated pressure at constant or variable frequencies is used. For example, in an embodiment forming a polycrystalline diamond compact, the system pressure, when near the change points defined by the Berman-Simon line (see FIG. 14), may be quickly adjusted. A sudden release in pressure during the compaction process may allow the diamond phase to convert back to graphite. The HPHT process may, therefore, include modulating the pressure near the change points defined by the Berman-Simon line to facilitate the nucleation of graphite on the surface of diamond particles. The presence of graphite on the grains of diamond may promote inter-granular bonding during sintering. Therefore, later in the process, when the system conditions are increased back into the diamond stable region, the diamond-to-diamond bonding, i.e., formation of inter-granular bonds 31, may be improved. The frequency of the modulation may control the localization of the pressure modulations by interacting with the grain structure of the hard material. Thus, in the kilohertz, megahertz, or gigahertz range, the scale of nucleated graphite within the microstructure to be sintered may be modified. The higher the frequency, the smaller and more localized the nucleation sites may be.

In some embodiments, oscillating the system pressure between a plateau pressure 307 (FIG. 13) and a peak pressure 317 may include raising the system pressure to the peak pressure 317, then releasing the pressure until it reaches the plateau pressure 307, and then repeating the raising and the releasing. The maximum pressure within each subsequent spike may be about equal to the maximum pressure of its neighboring spike, or may be different. Likewise, the minimum pressure within each valley between subsequent spikes may be about equal to the minimum pressure of its neighboring valley or may be different. In embodiments in which the series of spikes have different maximum pressures, the peak pressure 317 illustrated in, for example, FIG. 13 may represent the average maximum pressure of the series of pressure oscillations. In embodiments in which the series of valleys between spikes have different minimum pressures, the plateau pressure 307 illustrated in, for example, FIG. 13 may represent the average minimum pressure of the series of pressure oscillations.

Any of the foregoing embodiments may also include the application of ultrasonic or mechanical vibrations that may be imparted to the components subjected to the HPHT process by an excitation device that may be separate from and external to the press device. The vibrations imparted may be in the frequency range of hertz to kilohertz (e.g., about 1 Hz to about 1 kHz), which may be sufficient to enhance nucleation of new diamond (or other hard material) grains, as mentioned in U.S. patent application Ser. No. 12/852,313, or inter-granular bonds, especially when the pressure-temperature conditions are near the Berman-Simon line transition between the diamond-carbon phases of the phase diagram. Likewise, a similar effect may be obtained under rapid temperature profiles configured for sintering (i.e., inter-granular bonding) fine grained nanostructured polycrystalline composites. The use of ultrasonic or mechanical vibrations may accommodate low-temperature synthesis of nano-hard-material (e.g., nano-diamond) composites. The frequency of the vibrations may be selected to tailor the resulting level of inter-granular bonding.

Any of the foregoing described HPHT processes may be applied to a first run polycrystalline compact, i.e., with a modified one-step HPHT process (see FIG. 4), or a re-attached table process, i.e., with a modified second step of a two-step HPHT process (see FIG. 5).

The polycrystalline compacts resulting from the methods herein above described are also encompassed by this disclosure.

Additional non-limiting example embodiments of the disclosure are described below.

Embodiment 1

A method for forming a cutting element comprising a polycrystalline material supported by a supporting substrate, the method comprising introducing coarse grains of hard material, fine grains of the hard material, and a catalyst material to a press; elevating a system temperature to a plateau temperature; elevating a system pressure to a plateau pressure; spiking the system temperature from the plateau temperature to a peak temperature; and lowering the system temperature from the peak temperature to the plateau temperature.

Embodiment 2

The method of Embodiment 1, further comprising spiking the system pressure from the plateau pressure to a peak pressure; and lowering the system pressure from the peak pressure to the plateau pressure.

Embodiment 3

The method of Embodiment 2, wherein spiking the system temperature and spiking the system pressure are initiated simultaneously.

Embodiment 4

The method of Embodiment 2, wherein spiking the system temperature and spiking the system pressure are not initiated simultaneously.

Embodiment 5

The method of any one of Embodiments 2 through 4, wherein spiking the system pressure comprises elevating the system pressure from the plateau pressure to reach the peak pressure about simultaneously as the system temperature reaches the peak temperature.

Embodiment 6

The method of any one of Embodiments 2 through 5, wherein spiking the system pressure from the plateau pressure to a peak pressure comprises spiking the system pressure from the plateau pressure to a peak pressure that is about 1.5 GPa to about 10.0 GPa higher than the plateau pressure.

Embodiment 7

The method of any one of Embodiments 2 through 6, wherein spiking the system pressure from the plateau pressure to a peak pressure comprises spiking the system pressure from a plateau pressure in an approximate range of about 5.0 GPa to about 8.0 GPa to a peak pressure in an approximate range of about 6.5 GPa to about 15.0 GPa.

Embodiment 8

The method of any one of Embodiments 1 through 7, wherein spiking the system temperature from the plateau temperature to a peak temperature comprises spiking the system temperature from the plateau temperature to a peak temperature at least about 100° C. higher than the plateau temperature.

Embodiment 9

The method of any one of Embodiments 1 through 8, wherein spiking the system temperature from the plateau temperature to a peak temperature comprises spiking the system temperature from the plateau temperature to a peak temperature about 100° C. to about 300° C. higher than the plateau temperature.

Embodiment 10

The method of any one of Embodiments 1 through 9, wherein spiking the system temperature from the plateau temperature to a peak temperature comprises spiking the system temperature from a plateau temperature in an approximate range of about 1400° C. to about 1500° C. to a peak temperature in an approximate range of about 1500° C. to about 1800° C.

Embodiment 11

The method of any one of Embodiments 1 through 10, wherein the acts of spiking the system temperature and lowering the system temperature are accomplished in a total time of less than one minute.

Embodiment 12

The method of any one of Embodiments 1 through 11, wherein the acts of spiking the system temperature and lowering the system temperature are accomplished in a total time of less than thirty seconds.

Embodiment 13

The method of any one of Embodiments 1 through 12, further comprising vibrating the coarse grains of hard material, the fine grains of the hard material, and the catalyst material with ultrasonic vibrations.

Embodiment 14

The method of any one of Embodiments 1 through 13, wherein spiking the system temperature from the plateau temperature to a peak temperature comprises altering a power input level to adjust the system temperature.

Embodiment 15

A method for forming a polycrystalline compact comprising grains of a hard material, the method comprising elevating to a plateau temperature a system temperature to which the grains are subjected; elevating to a plateau pressure a system pressure to which the grains are subjected; and spiking at least one of the system temperature and the system pressure to form inter-granular bonds between the grains.

Embodiment 16

The method of Embodiment 15, wherein spiking at least one of the system temperature and the system pressure comprises oscillating the system pressure between the plateau pressure and a peak pressure.

Embodiment 17

The method of any one of Embodiments 15 and 16, further comprising subjecting the grains to at least one of ultrasonic vibrations and mechanical vibrations.

Embodiment 18

The method of Embodiment 17, wherein subjecting the grains to at least one of ultrasonic vibrations and mechanical vibrations comprises subjecting the grains to ultrasonic vibrations in a range of about 1 Hz to about 1 kHz.

Embodiment 19

A polycrystalline compact comprising grains of a hard material inter-granularly bonded to one another by elevating a temperature to which the grains are subjected, elevating a pressure to which the grains are subjected, and spiking at least one of the temperature and the pressure to which the grains are subjected.

Embodiment 20

The polycrystalline compact of Embodiment 19, wherein the hard material comprises at least one of diamond and cubic boron nitride.

Although the foregoing description contains many specifics, these are not to be construed as limiting the scope of the present disclosure, but merely as providing certain embodiments. Similarly, other embodiments of the disclosure may be devised that do not depart from the scope of the present invention. For example, materials and techniques described herein with reference to one embodiment also may be provided in others of the embodiments described herein. The scope of the invention is, therefore, indicated and limited only by the appended claims and their legal equivalents, rather than by the foregoing description. All additions, deletions, and modifications to the disclosure, as disclosed herein, which fall within the meaning and scope of the claims, are encompassed by the present invention.

What is claimed is:

1. A method for forming a cutting element comprising a polycrystalline material supported by a supporting substrate, the method comprising:
    introducing coarse grains of hard material, fine grains of the hard material, and a catalyst material to a press;
    elevating a system temperature to a plateau temperature;
    elevating a system pressure to a plateau pressure;
    spiking the system temperature from the plateau temperature to a peak temperature; and
    lowering the system temperature from the peak temperature to the plateau temperature,
    wherein the acts of spiking the system temperature and lowering the system temperature are accomplished in a total time of less than one minute.

2. The method of claim 1, further comprising:
    spiking the system pressure from the plateau pressure to a peak pressure; and
    lowering the system pressure from the peak pressure to the plateau pressure.

3. The method of claim 2, wherein spiking the system temperature and spiking the system pressure are initiated simultaneously.

4. The method of claim 2, wherein spiking the system temperature and spiking the system pressure are not initiated simultaneously.

5. The method of claim 2, wherein spiking the system pressure comprises elevating the system pressure from the plateau pressure to reach the peak pressure about simultaneously as the system temperature reaches the peak temperature.

6. The method of claim 2, wherein spiking the system pressure from the plateau pressure to a peak pressure comprises spiking the system pressure from the plateau pressure to a peak pressure that is about 1.5 GPa to about 10.0 GPa higher than the plateau pressure.

7. The method of claim 2, wherein spiking the system pressure from the plateau pressure to a peak pressure comprises spiking the system pressure from a plateau pressure in an approximate range of about 5.0 GPa to about 8.0 GPa to a peak pressure in an approximate range of about 6.5 GPa to about 15.0 GPa.

8. The method of claim 1, wherein spiking the system temperature from the plateau temperature to a peak temperature comprises spiking the system temperature from the plateau temperature to a peak temperature at least about 100° C. higher than the plateau temperature.

9. The method of claim 1, wherein spiking the system temperature from the plateau temperature to a peak temperature comprises spiking the system temperature from the plateau temperature to a peak temperature about 100° C. to about 300° C. higher than the plateau temperature.

10. The method of claim 1, wherein spiking the system temperature from the plateau temperature to a peak temperature comprises spiking the system temperature from a plateau temperature in an approximate range of about 1400° C. to about 1500° C. to a peak temperature in an approximate range of about 1500° C. to about 1800° C.

11. The method of claim 1, wherein the acts of spiking the system temperature and lowering the system temperature are accomplished in a total time of less than thirty seconds.

12. The method of claim 1, further comprising vibrating the coarse grains of hard material, the fine grains of the hard material, and the catalyst material with ultrasonic vibrations.

13. The method of claim 1, wherein spiking the system temperature from the plateau temperature to a peak temperature comprises altering a power input level to adjust the system temperature.

14. A method for forming a polycrystalline compact comprising grains of a hard material, the method comprising:
    elevating to a plateau temperature a system temperature to which the grains are subjected;
    elevating to a plateau pressure a system pressure to which the grains are subjected; and
    spiking at least one of the system temperature and the system pressure to form inter-granular bonds between the grains, comprising oscillating the system pressure between the plateau pressure and a peak pressure.

15. The method of claim 14, further comprising subjecting the grains to at least one of ultrasonic vibrations and mechanical vibrations.

16. The method of claim 15, wherein subjecting the grains to at least one of ultrasonic vibrations and mechanical vibrations comprises subjecting the grains to ultrasonic vibrations in a range of about 1 Hz to about 1 kHz.

17. A method for forming a cutting element comprising a polycrystalline material supported by a supporting substrate, the method comprising:
    introducing coarse grains of hard material, fine grains of the hard material, and a catalyst material to a press;
    elevating a system temperature to a plateau temperature;
    elevating a system pressure to a plateau pressure;
    holding the system temperature and the system pressure at the plateau temperature and the plateau pressure, respectively;
    after the holding, altering a power input level to spike the system temperature from the plateau temperature to a peak temperature; and
    lowering the system temperature from the peak temperature to the plateau temperature,
    wherein a duration, from initiating the altering of the power input level to completion of the lowering of the system temperature to the plateau temperature, is shorter than a duration of the holding of the system temperature and the system pressure.

18. The method of claim 17, wherein introducing coarse grains of hard material, fine grains of the hard material, and a catalyst material to a press comprises introducing coarse grains of at least one of diamond and cubic boron nitride, fine grains of the at least one of diamond and cubic boron nitride, and the catalyst material to the press.

* * * * *